US009026711B2

(12) United States Patent
Kessler

(10) Patent No.: US 9,026,711 B2
(45) Date of Patent: May 5, 2015

(54) MOTOR VEHICLE CONTROL SYSTEM WITH SIMPLIFIED INFORMATION EXCHANGE

(71) Applicant: Lear Corporation GmbH, Ginsheim-Gustavburg (DE)

(72) Inventor: Matthias Kessler, Munich (DE)

(73) Assignee: Lear Corporation GmbH, Ginsheim-Gustavburg (DE)

( * ) Notice: Subject to any disclaimer, the term of this patent is extended or adjusted under 35 U.S.C. 154(b) by 257 days.

(21) Appl. No.: 13/712,293

(22) Filed: Dec. 12, 2012

(65) Prior Publication Data
US 2013/0159586 A1 Jun. 20, 2013

(30) Foreign Application Priority Data
Dec. 15, 2011 (DE) .......................... 10 2011 121 255

(51) Int. Cl.
G06F 13/14 (2006.01)
G06F 13/36 (2006.01)
G06F 13/38 (2006.01)
H04L 12/66 (2006.01)

(52) U.S. Cl.
CPC ................ *G06F 13/38* (2013.01); *H04L 12/66* (2013.01)

(58) Field of Classification Search
CPC ..... H04L 67/02; H04L 67/06; G06F 17/2247; G06F 17/30867; G06F 17/30905
USPC .................................................. 710/305, 315
See application file for complete search history.

(56) References Cited

U.S. PATENT DOCUMENTS

| 6,564,128 | B2 | 5/2003 | Baird et al. |
| 6,654,355 | B1 * | 11/2003 | Marbach et al. .............. 370/285 |
| 6,845,416 | B1 * | 1/2005 | Chasmawala et al. ........ 710/107 |
| 7,317,974 | B2 | 1/2008 | Luskin et al. |
| 7,532,640 | B2 * | 5/2009 | Kelly et al. .................... 370/466 |
| 8,705,527 | B1 * | 4/2014 | Addepalli et al. ............ 370/389 |
| 8,826,261 | B1 * | 9/2014 | Ag et al. ........................ 717/168 |
| 2004/0182574 | A1 * | 9/2004 | Adnan et al. ............. 166/250.01 |
| 2005/0002417 | A1 | 1/2005 | Kelly et al. |
| 2007/0043457 | A1 * | 2/2007 | Davis .............................. 700/90 |
| 2007/0121641 | A1 * | 5/2007 | Hovey et al. ................ 370/395.2 |
| 2007/0198144 | A1 * | 8/2007 | Norris et al. ..................... 701/23 |
| 2008/0274689 | A1 * | 11/2008 | Kuban .............................. 455/7 |
| 2008/0306645 | A1 | 12/2008 | Dewhurst et al. |
| 2009/0144395 | A1 * | 6/2009 | DeSalvo ....................... 709/219 |

(Continued)

FOREIGN PATENT DOCUMENTS

CN 101662488 A 3/2010

OTHER PUBLICATIONS

"CAN Specification", Sep. 1991, Robert Bosch GmbH, Version 2.0, p. 15.*

(Continued)

*Primary Examiner* — Faisal M Zaman
(74) *Attorney, Agent, or Firm* — Brooks Kushman P.C.

(57) ABSTRACT

A control system includes a gateway controller and a remote controller. The gateway controller is configured to embed an HTTP request in a CAN bus-compatible message and transmit the CAN bus-compatible message onto a CAN bus. The remote controller is configured to receive the CAN bus-compatible message from the CAN bus, extract the HTTP request from the CAN bus-compatible message, and create an HTTP response to the HTTP request.

18 Claims, 3 Drawing Sheets

(56) References Cited

U.S. PATENT DOCUMENTS

2009/0313273 A1* 12/2009 Wexler et al. .............. 707/100
2010/0191801 A1* 7/2010 Sodergren .................. 709/203

OTHER PUBLICATIONS

Ramakrishnan, A., "16-bit embedded Web server," Sensors for Industry Conference, 2004. Proceedings the ISA/IEEE, pp. 187-193, 2004.*

Krist, P., "MicroCANopen distributed control node Ethernet HTTP monitoring," Applied Electronics, 2009. AE 2009, pp. 165-168, Sep. 9-10, 2009.*

Jouvray, C.; Gerard, S.; Terrier, F.; Bouaziz, S.; Reynaud, R., "Smart sensor modeling with the UML for real-time embedded applications," Intelligent Vehicles Symposium, 2004 IEEE, pp. 919-924, Jun. 14-17, 2004.*

German Patent Office, Office Action for the corresponding German Patent Application No. 10 2011 121 255.1 mailed Jan. 6, 2012.

* cited by examiner

MOTOR VEHICLE CONTROL SYSTEM WITH SIMPLIFIED INFORMATION EXCHANGE

CROSS-REFERENCE TO RELATED APPLICATIONS

This application claims foreign priority benefits under 35 U.S.C. §119(a)-(d) to DE 10 2011 121 255.1, filed Dec. 15, 2011; the disclosure of which is hereby incorporated by reference in its entirety.

TECHNICAL FIELD

The present invention relates to vehicle controllers, in particular those vehicle controllers that are connected together through a Controller Area Network (CAN) bus.

BACKGROUND

Electronics play an ever more important role in vehicles. Many vehicle functions are continually monitored and/or controlled by controllers. Controllers are electronic modules that are used not only to control electronic components in vehicles, but also to control machines, facilities, and other technical processes. Such controllers are embedded systems. Continually increasing requirements, for example on driving safety, reducing emissions, and reducing fuel consumption, require an increasing exchange of information among the individual controllers in vehicles.

Conventional wiring requires one line for each connection between two controllers. Thus, as the functional scope of vehicle electronics increases, the length and weight of the wiring harness and the number of connections to the controllers increases. Therefore, in modern vehicles, controllers are connected together through various system busses such as, for example, the CAN (Controller Area Network) bus, the LIN (Local Interconnect Network) bus, or the MOST (Media Oriented Systems Transport) bus. The devices use these system busses to exchange information about operating states, control commands, and other relevant data of the vehicle. In addition, such busses can be used, for example, to connect a vehicle diagnosis system.

The components used in modern vehicles place different requirements on the bus system that is used. For example, use in the area of engine management requires rapid data transmission. On the other hand, an air conditioner does not have to react to temperature changes in the passenger compartment within fractions of a second. Here, longer delays can be accepted.

Usually, various different rapid bus systems are used in a vehicle. The drive bus, e.g., the Powertrain CAN bus, includes engine, transmission, and brake controllers, as well as other sensors/actuators that are directly related with them. The Powertrain CAN bus is a high-speed CAN. A comfort CAN or body CAN is used to run comfort systems such as power windows, seat memory, or tire pressure. Simple applications such as an air conditioner or wiper control commonly use a single wire bus such as the LIN bus. The infotainment area uses MOST busses with optical waveguides because of the large quantity of data.

One or more central controllers (gateways) bring information together and are adapted to the respective bus system. The data is also forwarded from one CAN system to another. These gateways often can also be queried for diagnostic purposes.

In the long term, legislation is pushing to have diagnosis of the controllers done over Ethernet. This will result in at least one controller in a vehicle having an Ethernet connection. Ethernet is a common bus system used to access web pages. The standard protocol that networks use to transport web pages is HTTP (hypertext transport protocol).

Therefore, it is relatively simple for a controller that has an Ethernet connection to make available a web page that can be accessed by HTTP over Ethernet. Web pages are a simple way of exchanging information and are relatively popular, e.g., on the World Wide Web or Internet.

However, most vehicle controllers do not have an Ethernet connection, but rather are only connected with a CAN bus, for example. It would be desirable for controllers that do not have an Ethernet connection also be able to make web pages available to make it easier to exchange information, e.g., for diagnostic purposes or to configure the controllers.

SUMMARY

An object of the present invention is to facilitate information exchange with controllers that are connected through a CAN bus.

Another object of the present invention is to facilitate information exchange with controllers that do not have an Ethernet connection and are connected through a bus such as a CAN bus.

In carrying out at least one of the above and other objects, the present invention provides a control system for a vehicle. The control system includes a gateway controller and a remote controller. The gateway controller is configured to embed an HTTP request in a CAN bus-compatible message and transmit the CAN bus-compatible message onto a CAN bus. The remote controller is configured to receive the CAN bus-compatible message from the CAN bus, extract the HTTP request from the CAN bus-compatible message, and create an HTTP response to the HTTP request.

The remote controller may be further configured to embed the HTTP response in a second CAN bus-compatible message and transmit the second CAN bus-compatible message onto the CAN bus. The gateway controller may be further configured to receive the second CAN bus-compatible message from the CAN bus and extract the HTTP response from the second CAN bus-compatible message.

Further, in carrying out at least one of the above and other objects, the present invention provides a method for a vehicle control system having a gateway controller and a remote controller connected by a CAN bus. The method includes the gateway controller: receiving an HTTP request by a message compatible with the Ethernet standard; creating a CAN bus-compatible message in which the HTTP request is embedded; and transmitting the CAN bus-compatible message through the CAN bus to the remote controller.

The method may further include the remote controller: receiving the CAN bus-compatible message from the CAN bus; and extracting the HTTP request from the received CAN bus-compatible message. In this case, the method may further include the remote controller: creating an HTTP response to the HTTP request; creating a second CAN bus-compatible message in which the HTTP request is embedded; and transmitting the second CAN bus-compatible message through the CAN bus to the gateway controller. In these cases, the method may further include the gateway controller: receiving the second CAN bus-compatible message from the CAN bus; and extracting the HTTP request from the received second CAN bus-compatible message.

Also, in carrying out at least one of the above and other objects, the present invention provides a method for a vehicle control system having a gateway controller and a remote controller connected by a CAN bus. The method includes the remote controller: receiving a CAN bus-compatible message in which an HTTP request is embedded from the CAN bus; extracting the HTTP request from the received CAN bus-compatible message; and creating an HTTP response to the HTTP request.

The method may further include the remote controller: creating a second CAN bus-compatible message in which the HTTP request is embedded; and transmitting the second CAN bus-compatible message through the CAN bus to the gateway controller. In this case, the method may further include the gateway controller: receiving the second CAN bus-compatible message from the CAN bus; and extracting the HTTP request from the received second CAN bus-compatible message.

Embodiments of the present invention are directed to a system for use in a vehicle. The system includes a first controller (e.g., one of a gateway controller and another controller such as a remote controller) and a second controller (e.g., the other of the gateway controller and the other controller). The controllers are connected through a Controller Area Network (CAN) bus. The first controller is set up to embed a Hypertext Transport Protocol (HTTP) request in a CAN bus-compatible message. The second controller is set up to extract the HTTP request from the CAN bus-compatible message and forward the HTTP request to a web server.

In embodiments of the present invention, a vehicle control system has a first controller, a second controller, and a CAN bus. The first controller is set up to embed an HTTP request in at least one first CAN bus-compatible message. The second controller is set up to extract the HTTP request from the at least one first CAN bus-compatible message and forward it to a first web server. The CAN bus connects the first controller with the second controller.

Some embodiments of the present invention are directed to a process for operating the first controller (e.g., one of a gateway controller and another controller) in a vehicle control system. In this operating process, the first controller receives an HTTP request by a message that is compatible with the Ethernet standard. The first controller then creates a CAN bus-compatible message in which the HTTP request is embedded. Finally, the first controller sends the CAN bus-compatible message through a CAN bus to another controller in the vehicle control system.

Some embodiments of the present invention are directed to a process for operating the second controller (e.g., the other one of the gateway controller and another controller) in a vehicle control system. In this operating process, the second controller receives a CAN bus-compatible message having the HTTP request embedded therein through a CAN bus from a first controller (e.g., one of a gateway controller and another controller) in the vehicle control system. The second controller extracts an HTTP request from the CAN bus-compatible message. Finally, the second controller forwards the HTTP request to a web server.

The above features, and other features and advantages of the present invention are readily apparent from the following detailed description thereof when taken in connection with the accompanying drawings. It is understood that the features stated above and to be explained below may be used not only in the particular stated combination, but also in other combinations or alone without departing from the scope of the present invention.

DETAILED DESCRIPTION

Figure 1:
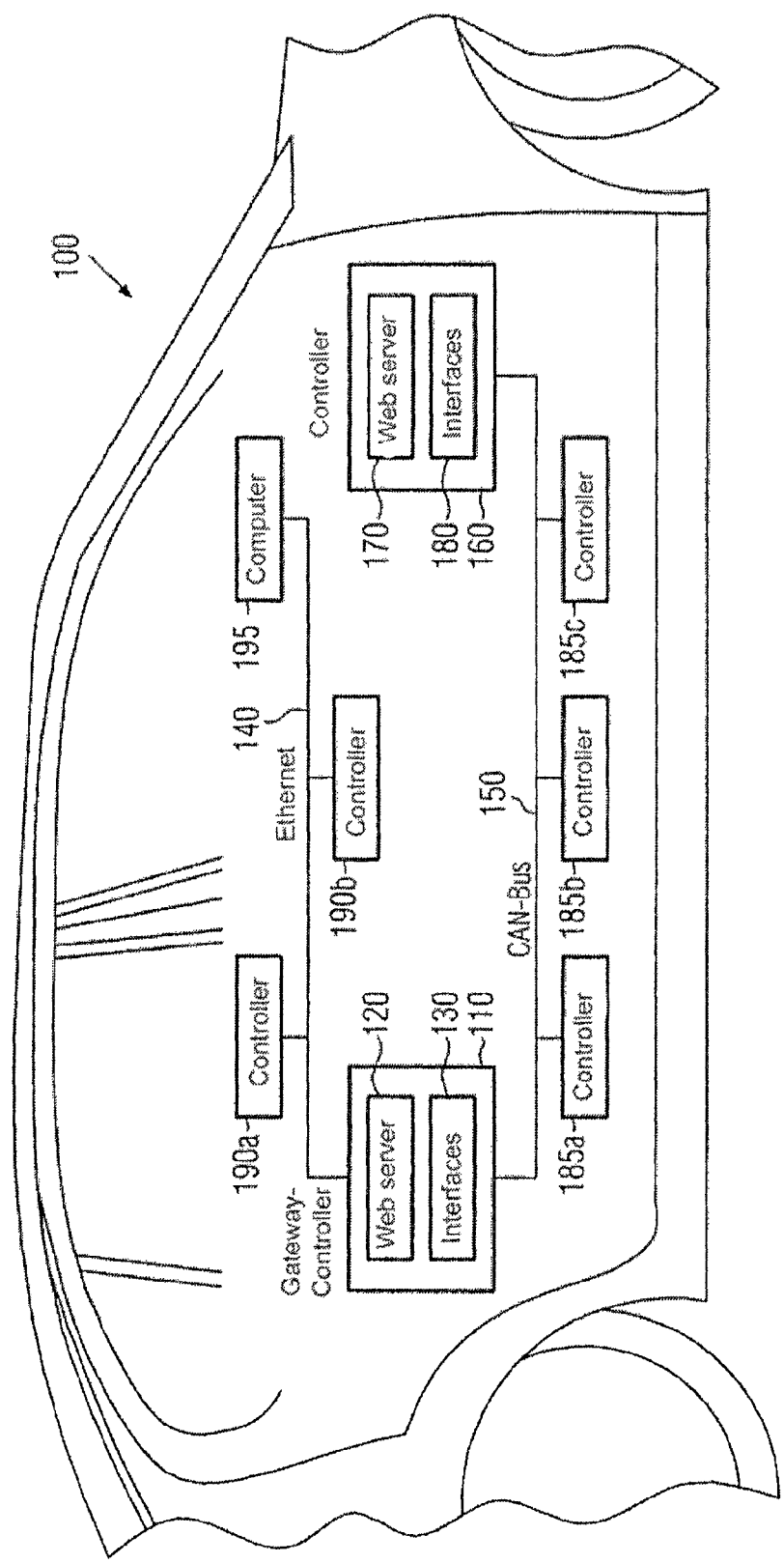
FIG. 1 illustrates a schematic representation of controllers that communicate with one another through a CAN bus in a vehicle and are connected through a gateway controller with an Ethernet network according to an embodiment of the present invention.

Detailed embodiments of the present invention are disclosed herein; however, it is to be understood that the disclosed embodiments are merely exemplary of the present invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

A Controller Area Network (CAN) connects several equal-access components (nodes) with one another through a system bus, the CAN bus. Bosch® developed the CAN protocol for use in motor vehicles. Because of its high immunity to interference, low cost, and real-time capability, the CAN protocol is also used in automation technology, especially in textile machines, elevator control, and farm machinery. The CAN protocol and many other bus protocols are defined in ISO 11898. Many microchips are available that implement this specification.

Nodes in a CAN bus according to embodiments of the present invention are generally vehicle controllers. Controllers are usually embedded systems that monitor, control, and/or regulate an area of the vehicle. Controllers use sensors, for example, to determine physical parameters such as the engine's rotational speed, the temperature in the passenger compartment, the engine temperature, the tire pressure, etc. The measured physical parameters are then compared for example with expected values that are stored in the controller or calculated. If the measured value of the parameter does not coincide with the expected value, then the controller uses actuators to readjust the physical process so that the measured parameters coincide with the expected values. Therefore, the actuators intervene in a running process to correct it.

In a CAN-Bus, data transmission does not involve addressing any controllers. Instead, the content of a message (such as the parameter that a controller determines, e.g., rotational speed or engine temperature) is identified by a unique identifier. In addition to identifying the content, the identifier also specifies the priority of the message. After controllers have correctly received the message, they perform acceptance testing on the basis of the identifier to determine whether or not the received data is relevant for them. The content-based addressing achieves high flexibility. It is very simple to add controllers to the existing CAN network.

The CAN network is used for diagnostic purposes, among other things. In the long term, legislation is pushing to have diagnosis done over Ethernet. Therefore, future vehicles will have at least one controller with an Ethernet interface. Concurrently, the vehicles will still have many controllers that are connected only to a CAN bus or to another vehicle bus and that do not have an Ethernet interface.

FIG. 1 illustrates one possible way of networking controllers in a vehicle. Controllers 190-A and 190-B and a gateway controller 110 are connected to a vehicle Ethernet network 140. In embodiments of the present invention, the vehicle only has one (gateway) controller 110 that has an Ethernet interface, and does not itself have any Ethernet network 140 or controllers 190-A, 190-B connected to an Ethernet network. By contrast, controllers 160, 185-A, 185-B, and 185-C do not have any Ethernet interface and are connected only to one or more vehicle busses 150 such as a CAN bus, LIN bus, or MOST bus. For simplicity, only a CAN bus 150 is described below. However, the vehicle bus can also be a LIN bus, a MOST bus, or another vehicle bus (except Ethernet). All controllers that are present, such as, for example controllers 110, 160, 185-A, 185-B, 185-C, 190-A, and 190-B, and all vehicle busses 150 considered as a whole can also be referred to as a vehicle control system. As was already mentioned, in some embodiments the vehicle control system also has Ethernet network 140.

A common protocol for communicating over Ethernet is Hypertext Transfer Protocol (HTTP). HTTP is a protocol for transferring data over a network. It is mainly used for loading web pages from the World Wide Web in a web browser.

Now, people are accustomed to collecting data through web pages, which are called up and displayed by a browser. Accordingly, it would be desirable, for example, to diagnose and/or configure the controllers 110, 190-A, 190-B, 185-A, 185-B, 185-C, and 160 by using the HTTP protocol and displaying web pages that are provided by the individual controllers 110, 190-A, 190-B, 185-A, 185-B, 185-C, and 160.

While controllers 110, 190-A, and 190-B are directly connected to the Ethernet network 140, and thus easily accessible by the HTTP protocol, controllers 185-A, 185-B, 185-C, and 160 do not have such a connection. Rather, controllers 185-A, 185-B, 185-C, and 160 are networked with controller 110 only through CAN bus 150. Embodiments of the present invention make available a controller 110 that functions as a gateway between Ethernet network 140 and CAN bus 150.

Figure 2A:
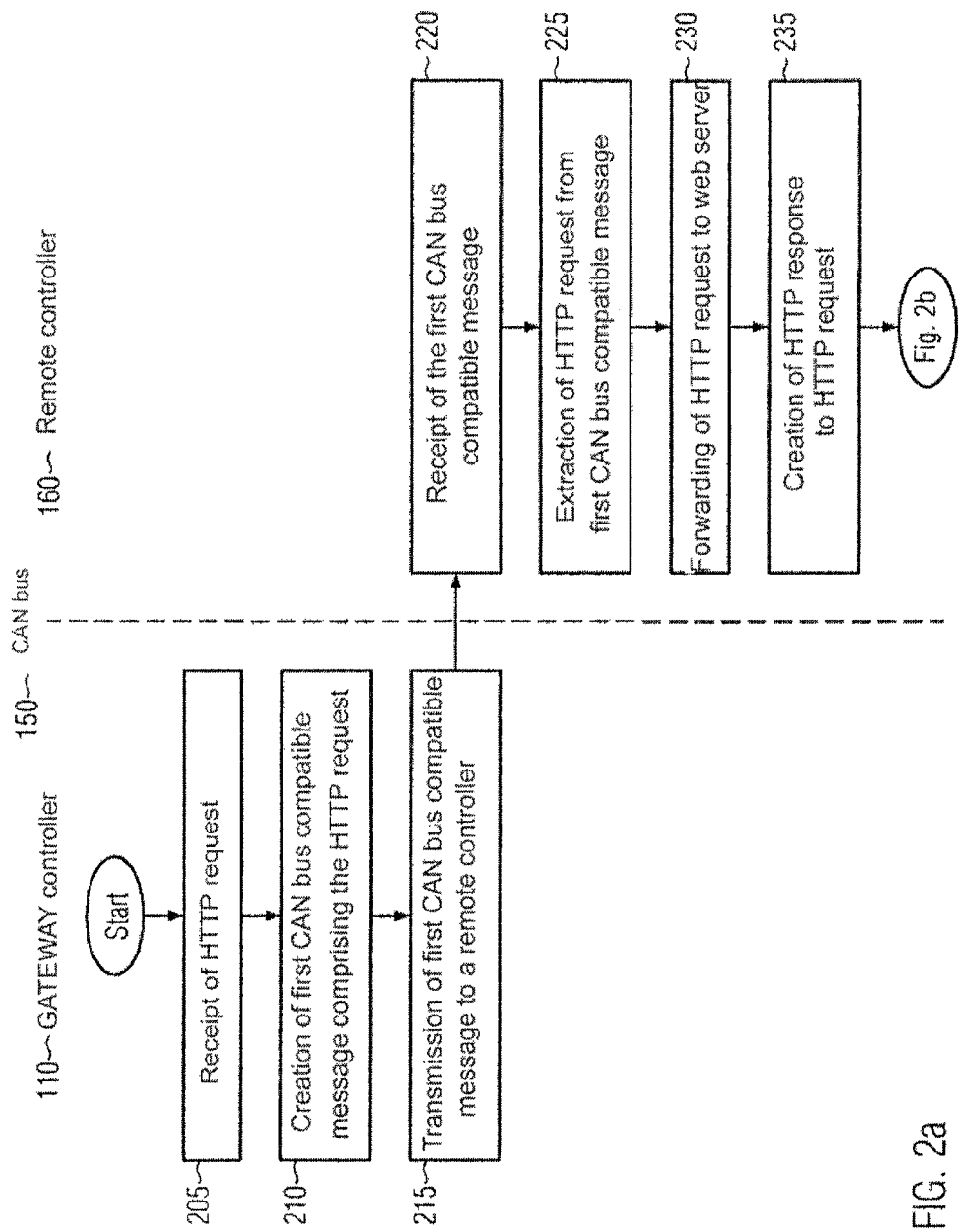
FIGS. 2a and 2b illustrate a flowchart describing operation to transfer an HTTP request and an HTTP response through a CAN bus in accordance with an embodiment of the present invention.
Figure 2B:
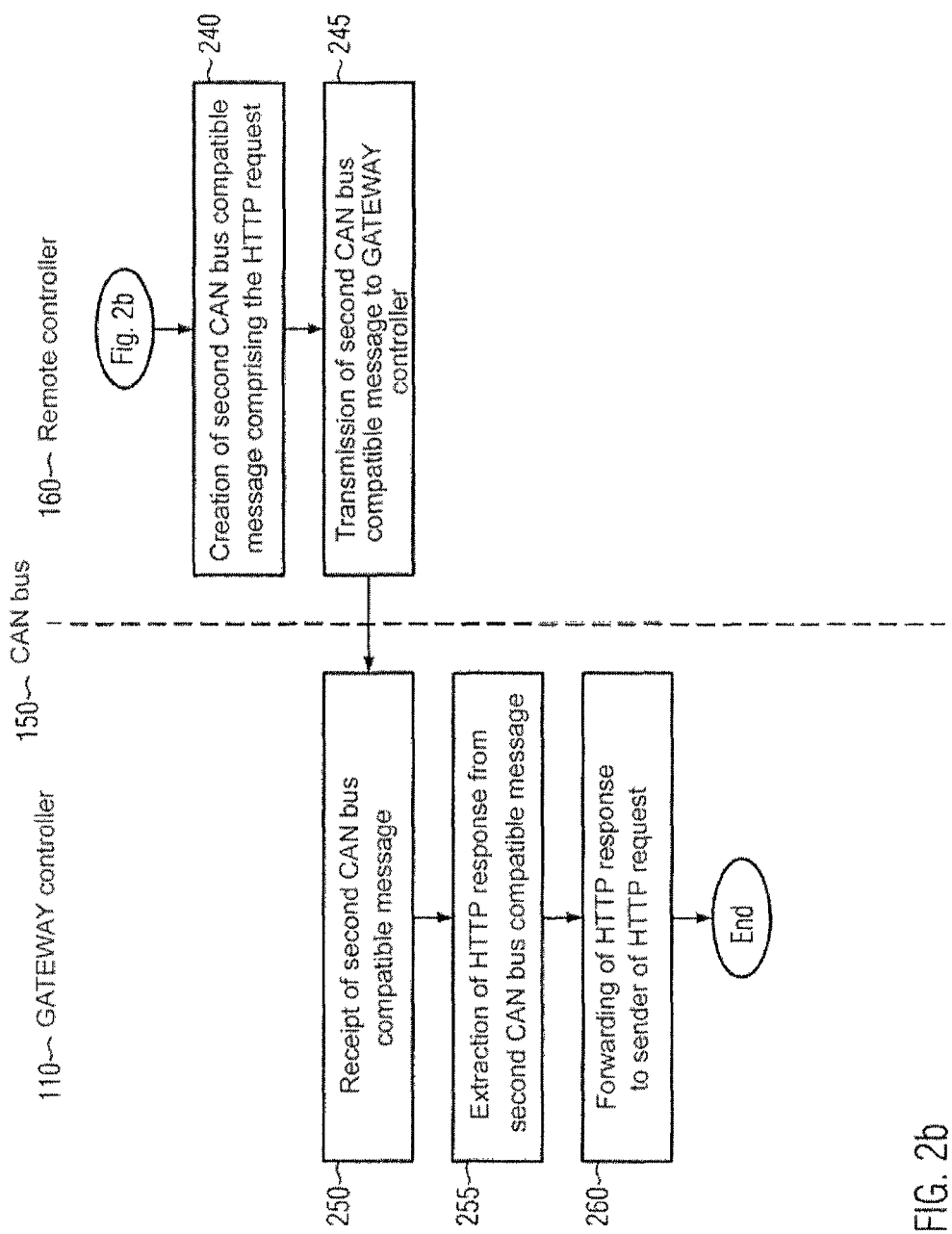

To describe how a vehicle control system in accordance with embodiments of the present invention works, the discussion below will refer both to FIG. 1 and also to the process shown in FIGS. 2a and 2b. In FIGS. 2a and 2b, the steps in the column with the heading "Gateway controller" are carried out by gateway controller 110. The steps in the column with the heading "Remote controller" are carried out by a controller that does not have any Ethernet interface and is connected only with CAN bus 150, for example. To make it simple in describing a vehicle control system in accordance with embodiments of the present invention, the discussion below refers exclusively to controller 160, and the steps listed in the column with the heading "Remote controller" are described as being carried out by controller 160 (i.e., remote controller 160). Of course controllers 185-A, 185-B, and 185-C can also be set up to carry out these steps and can have the same functionality as remote controller 160.

In the sample embodiment described here, gateway controller 110 receives an HTTP request intended for remote controller 160 over the Ethernet network 140, for example. Of course, in alternative embodiments, the HTTP request can also be intended for one of the other controllers 185-A, 185-B, and 185-C that are connected to CAN bus 150. However, better illustration of how embodiments of the present invention work, the discussion below assumes that the HTTP request is intended for controller 160. Here, the HTTP request can be produced by one of controllers 190-A or 190-B, but it can also be produced by a general-purpose computer (PC, notebook, or tablet) 195.

In step 205 gateway controller 110 receives the HTTP request. Controller 110 can receive this HTTP request from computer 195 or from one of the controllers 190-A or 190-B over the Ethernet network 140, for example. The HTTP request can be produced, for example, by a user of computer 195 using a browser, if the user of the browser is interested, for example, in diagnosing or configuring remote controller 160, or accessing measurements of its sensors.

In step 210, gateway controller 110 creates a first CAN bus-compatible message in which the HTTP request is embedded. If the HTTP request contains too much data to be embedded in a single CAN bus-compatible message, then gateway controller 110 creates as many CAN bus-compatible messages as necessary to embed the complete HTTP request in CAN bus-compatible messages. For simplicity, the discussion below assumes that the HTTP request can be embedded in a single CAN bus-compatible message.

Communication through the CAN bus is done by messages. These messages contain control bits and data bits. The standardized structure of such a message is called a frame. In embodiments there are four different types of frames on a CAN bus (also called CAN frames below): 1) a data frame that serves to transport up to eight bytes of data; 2) a remote frame that serves to request a data frame from another node; 3) an error frame that signals to all nodes a recognized error condition in transmission; and 4) an overload frame that serves as a forced pause between data and remote frames.

The data frame has the following logical structure. It begins with a start-of-frame (SOF) bit. This is followed by an arbitration field consisting of an identifier segment (11 bits or 29+2 bits) plus an RTR (remote transmission request) bit. After this comes a 6-bit long control field. Following this is a 0 to 64 bit-long data field in 8 bit units. This is followed by a 16-bit-long checksum field. Finally, the data frame has a 2-bit confirmation field, a 7-bit-long end-of-frame field, and a 3-bit-long field that separates successive messages.

The remote frame is labeled by having its RTR bit set. Using the remote frame, a node in the CAN bus can request another node in the CAN bus to send data.

In embodiments of the present invention, gateway controller 110 puts the unchanged data of the HTTP request in the data field of a CAN frame in step 210.

In some embodiments of the present invention, gateway controller 110 sets the RTR bit to identify the CAN frame as a remote frame. Thus, gateway controller 110 can request remote controller 160 to send data. Gateway controller 110 puts the HTTP request in the data field of the remote frame. In embodiments, the node sending data in response to the remote frame (the HTTP response) can adapt the length of the data field of the data frames to be sent according to the data it has to send (HTTP response). Some embodiments use a CAN protocol in which the data length of the data field in the remote frame must be set according to the expected data length of the response. In these embodiments, the length of the data fields in the remote frame and the data frames for embedding HTTP requests and/or HTTP responses is standardized and if necessary they are filled by padding bits, if the data of the HTTP request and/or the data of the HTTP response do not need the entire data field.

In embodiments of the present invention, gateway controller 110 has a special web page that recognizes that an incoming HTTP request is not intended for controller 110 but rather for another controller, for example remote controller 160. In such embodiments, gateway controller 110 has a web server 120 that makes the special web page available.

A web server is hardware or software that makes available documents, such as for example web pages, and clients, such as, e.g., web browsers. Web server 120 receives the HTTP request over Ethernet network 140 and identifies the special web page identified by the HTTP request. In embodiments of the present invention, the special web page creates the first CAN bus-compatible message in which the HTTP request is embedded. This can be done, for example, by executing web server-side scripts, such as, for example CGI or PHP scripts, that analyze the HTTP request and recognize that a remote controller, such as, for example, remote controller 160, is the addressee of the HTTP request and accordingly create the first CAN bus compatible message including the HTTP request.

For example, the special web page searches the HTTP request for one or more physical parameters (such as rotational speed or engine temperature). As was already mentioned, some CAN protocols that are used identify the contents of the message by a unique identifier. In embodiments, the contents of the message correspond to physical parameters that are monitored by a controller's sensors and/or controlled by a controller's actuators. In some embodiments, the special web page sets the identifier of the first CAN bus-compatible message according to the physical parameter(s) that it finds. For simplicity, the discussion below will assume that only one physical parameter is found. In step 215, gateway controller 110 sends the first CAN bus-compatible message that has been created to remote controller 160.

In embodiments of the present invention, interfaces and inheritance ensure that the implementation of the special web page that is made available by web server 120 is independent of the transmission path over which the data is then sent. Therefore, in such embodiments, gateway controller 110 includes one or more interfaces 130. Here, the special web page made available by web server 120 produces a request message to remote controller 160. The request message includes the data of the HTTP request and is independent of the transmission path.

In these embodiments, the special web page also searches the incoming HTTP request for physical parameters. However, in these embodiments the special web page does not, as described above, set the identifier of the first CAN bus-compatible message, but rather produces metadata about the request message including the physical parameter that is found. In other embodiments, the request message itself includes the physical parameter that is found.

The request message produced by the special web page is transferred along with the metadata to a first interface of gateway controller 110. The first interface is set up to produce the first CAN bus-compatible message in which the HTTP request is embedded on the basis of the request message. In one embodiment, the first interface of gateway controller 110 transfers this first CAN bus-compatible message, along with the metadata, to a second interface that is set up to determine the identifier of the physical parameter in the metadata and to set the identifier of the first CAN bus-compatible message accordingly. The second interface then sends the first CAN bus-compatible message through the CAN bus 150.

In embodiments in which the request message includes the physical parameter that is found, the first interface extracts the HTTP request from the request message and embeds the HTTP request in the first CAN bus-compatible message. The second interface extracts the physical parameter that is found from the request message and sets the identifier of the first CAN bus-compatible message on the basis of the extracted physical parameter.

In other embodiments, a single interface 130 assumes the functions of the first and second interfaces. The use of interfaces 130 ensures that the special web page can be implemented independently of the transfer protocol that is used. The task of interfaces 130 is to take the request message produced by the special web page (and in some embodiments the metadata produced by it) and use it as a basis for creating a message compatible with the selected transmission medium, in this example a CAN bus-compatible message. An example of a transmission protocol that can be used over the CAN bus is ISO-TP, but any other CAN bus-compatible protocol can be used.

To summarize, in one embodiment gateway controller 110 is first addressed in steps 205 to 215 from outside over Ethernet network 140 by computer 195, for example. In embodiments of the present invention, gateway controller 110 has a special web page that recognizes that the incoming HTTP request is intended for a remote controller, for example controller 160. Interfaces and inheritance ensure that the implementation of the special web page is independent of the transmission path. If the special web page of gateway controller 110 sends an HTTP request to remote controller 160, then this HTTP request can be sent by any protocol (e.g., ISO-TP) through CAN bus 150, with which controller 160 is connected. The only prerequisite is that gateway controller 110 and controller 160 use the same transport protocol. In addition to ISO-TP, lighter weight protocols are also conceivable.

In step 220, remote controller 160 recognizes that the first CAN bus-compatible message sent by gateway controller 110 is intended for controller 160, and it receives the first CAN bus-compatible message in step 220. Controller 160 extracts the HTTP request from the first CAN bus-compatible message in step 225. Controller 160 forwards the HTTP request to web server 170 in step 230.

In one embodiment, remote controller 160 includes web server 170 and forwards the HTTP request to web server 170. In other embodiments, controller 160 further includes an interface, such as, for example, a USB interface. Web server 170 can then, for example, be installed as software on a USB stick, which is then connected with the USB interface of controller 160 for diagnostic purposes. In this embodiment, web server 170, which is installed on the USB stick, assumes the functions of web server 170, which is described below as contained in controller 160.

In step 235, web server 170 creates an HTTP response to the HTTP request. In one embodiment, web server 170 makes available a web page that produces the HTTP response in response to the HTTP request. In this case, web server 170 can make use of that is delivered by sensors or actuators of remote controller 160, for example. Here, web server 170 can also make use of web server-side scripts such as CGI or PHP.

In order to make the implementation of the web page on remote controller 160 independent of the transport protocol, controller 160 can also have other interfaces 180 that are set up to receive the first CAN bus-compatible message through the CAN bus and recreate the HTTP request using the first CAN bus-compatible message. In one embodiment, these functionalities are implemented in two interfaces, and in another embodiment these functionalities are combined in one interface.

In step 240, remote controller 160 creates a second CAN bus-compatible message including the HTTP response and sends it in step 245 to gateway controller 110. In one embodiment, controller 160 embeds the HTTP response in the data field of a data frame, which is created, for example, in response to a remote frame of gateway controller 110.

In some embodiments, the creation and sending of the second CAN bus-compatible message is assumed by the interfaces 180 of gateway controller 160. For example, in some embodiments, the interface that recreated the HTTP request using the first CAN bus-compatible message is also set up to produce a second CAN bus-compatible message on the basis of the HTTP response. Moreover, the interface that received the first CAN bus-compatible message through the CAN bus is set up to send the second CAN bus-compatible message (back) to the (first) controller 110 through CAN bus 150.

In step 250, gateway controller 110 receives the second CAN bus-compatible message. In embodiments in which interfaces 130 are used to make the implementation of the special web page independent of the transport protocol that is used, the interface of gateway controller 110, for example, which sent the first CAN bus-compatible message through the CAN bus to the (second) controller 160, is also set up to receive the second CAN bus-compatible message through CAN bus 150. The interface that produced the first CAN bus-compatible message on the basis of the request message is also set up to recreate the HTTP response using the second CAN bus-compatible message.

In completely general terms, gateway controller 110 extracts the HTTP response from the second CAN bus-compatible message in step 255. In step 260, controller 110 forwards the HTTP response to the sender of the HTTP request over Ethernet network 140, for example. Thus, it is simple for a user of computer 195 using a browser to request data from controllers, such as, for example from controller 160, or to configure controllers that are not directly connected with the Ethernet network 140, but rather only through CAN bus 150.

Instead of an Ethernet network 140, it is also possible to use other transmission standards, such as, for example, standards from the IEEE 802 family.

Therefore, embodiments of the present invention make it substantially simpler to access diagnostic functions of controllers, configure the controllers, and/or gain access to information from the controllers. It is unnecessary to equip every individual controller with an Ethernet interface and connect it to an Ethernet network to exchange information using web pages. Instead, it is sufficient for controllers that are not connected to an Ethernet network, but rather only to a CAN bus, for example, to be equipped with a web server and have a gateway controller 110 as described herein available to them.

While exemplary embodiments are described above, it is not intended that these embodiments describe all possible forms of the present invention. Rather, the words used in the specification are words of description rather than limitation, and it is understood that various changes may be made without departing from the spirit and scope of the present invention. Additionally, the features of various implementing embodiments may be combined to form further embodiments of the present invention.

What is claimed is:

1. A control system for a vehicle, the control system comprising:
   a vehicle gateway controller able to communicate via an Ethernet bus and being configured to embed an HTTP request in the data field of a CAN data frame, create a CAN bus-compatible message including the CAN data frame and a CAN remote frame, and transmit the CAN bus-compatible message onto a vehicle CAN bus; and
   a vehicle remote controller having a first web server, the remote controller being configured to receive the CAN bus-compatible message from the CAN bus, extract the HTTP request from the CAN bus-compatible message, and forward the HTTP request to the first web server for the first web server to create an HTTP response to the HTTP request.

2. The control system of claim 1 wherein:
the first web server is further configured to make available a first web page that produces the HTTP response in response to the HTTP request.

3. The control system of claim 1 wherein:
the remote controller is further configured to embed the HTTP response in a second CAN bus-compatible message and transmit the second CAN bus-compatible message onto the CAN bus; and
the gateway controller is further configured to receive the second CAN bus-compatible message from the CAN bus and extract the HTTP response from the second CAN bus-compatible message.

4. The control system of claim 3 wherein:
the gateway controller is further configured to receive the HTTP request by a third message compatible with a standard from the IEEE 802 family and to send the HTTP response by a fourth message compatible with a standard from the IEEE 802 family.

5. The control system of claim 4 wherein:
the third and fourth messages are compatible with the Ethernet standard.

6. The control system of claim 3 wherein:
the second CAN bus-compatible message is a CAN data frame, and the HTTP response is embedded in the data field of the CAN data frame.

7. The control system of claim 1 wherein:
the gateway controller includes a second web server which makes available a second web page that is set up to recognize that the HTTP request is intended for the remote controller and to create a request message to the remote controller, in which the request message includes the data of the HTTP request.

8. The control system of claim 7 wherein:
the gateway controller includes first and second interfaces, the first interface configured to produce the CAN bus-compatible message on the basis of the request message and the second interface configured to send the CAN bus-compatible message to the remote controller through the CAN bus.

9. The control system of claim 8 wherein:
the remote controller includes third and fourth interfaces, the third interface configured to set up to receive the CAN bus-compatible message through the CAN bus and the fourth interface configured to recreate the HTTP request using the CAN bus-compatible message.

10. The control system of claim 9 wherein:
the remote controller is further configured to embed the HTTP response in a second CAN bus-compatible message and transmit the second CAN bus-compatible message onto the CAN bus; and
the gateway controller is further configured to receive the second CAN bus-compatible message from the CAN bus and extract the HTTP response from the second CAN bus-compatible message.

11. The control system of claim 10 wherein:
the fourth interface is further configured to produce the second CAN bus-compatible message on the basis of the HTTP response, the third interface is further configured to send the second CAN bus-compatible message to the gateway controller through the CAN bus, the second interface is further configured to receive the second CAN bus-compatible message through the CAN bus, and the first interface is further configured to recreate the HTTP response using the second CAN bus-compatible message.

12. A method for a vehicle control system having a gateway controller and a remote controller connected by a CAN bus, the gateway controller able to communicate via an Ethernet bus, the method comprising:

receiving by the gateway controller an HTTP request by a message compatible with the Ethernet standard;

creating by the gateway controller a CAN bus-compatible message including a CAN data frame and a CAN remote frame and embedding by the gateway controller the HTTP request in the data field of the CAN data frame; and transmitting by the gateway controller the CAN bus-compatible message through the CAN bus to the remote controller.

13. The method of claim 12 further comprising:

receiving by the remote controller the CAN bus-compatible message from the CAN bus; and extracting by the remote controller the HTTP request from the received CAN bus-compatible message.

14. The method of claim 13 further comprising:

creating by the remote controller an HTTP response to the HTTP request;

creating by the remote controller a second CAN bus-compatible message in which the HTTP request is embedded, wherein the second CAN bus-compatible message is a CAN data frame and the HTTP response is embedded in the data field of the CAN data frame; and transmitting by the remote controller the second CAN bus-compatible message through the CAN bus to the gateway controller.

15. The method of claim 14 further comprising:

receiving by the gateway controller the second CAN bus-compatible message from the CAN bus; and extracting by the gateway controller the HTTP request from the received second CAN bus-compatible message.

16. A method for a vehicle control system having a gateway controller and a remote controller connected by a CAN bus, the gateway controller able to communicate via an Ethernet bus, the method comprising:

receiving by the remote controller from the CAN bus a CAN bus-compatible message including a CAN data frame and a CAN remote frame in which an HTTP request is embedded in the data field of the CAN data frame;

extracting by the remote controller the HTTP request from the received CAN bus-compatible message; and creating by the remote controller an HTTP response to the HTTP request.

17. The method of claim 16 further comprising:

creating by the remote controller a second CAN bus-compatible message in which the HTTP request is embedded, wherein the second CAN bus-compatible message is a CAN data frame and the HTTP response is embedded in the data field of the CAN data frame; and transmitting by the remote controller the second CAN bus-compatible message through the CAN bus to the gateway controller.

18. The method of claim 17 further comprising:

receiving by the gateway controller the second CAN bus-compatible message from the CAN bus; and extracting by the gateway controller the HTTP request from the received second CAN bus-compatible message.

* * * * *